July 1, 1930.　　　F. W. COFFING　　　1,769,332
PORTABLE GUY CLAMP
Filed May 14, 1928
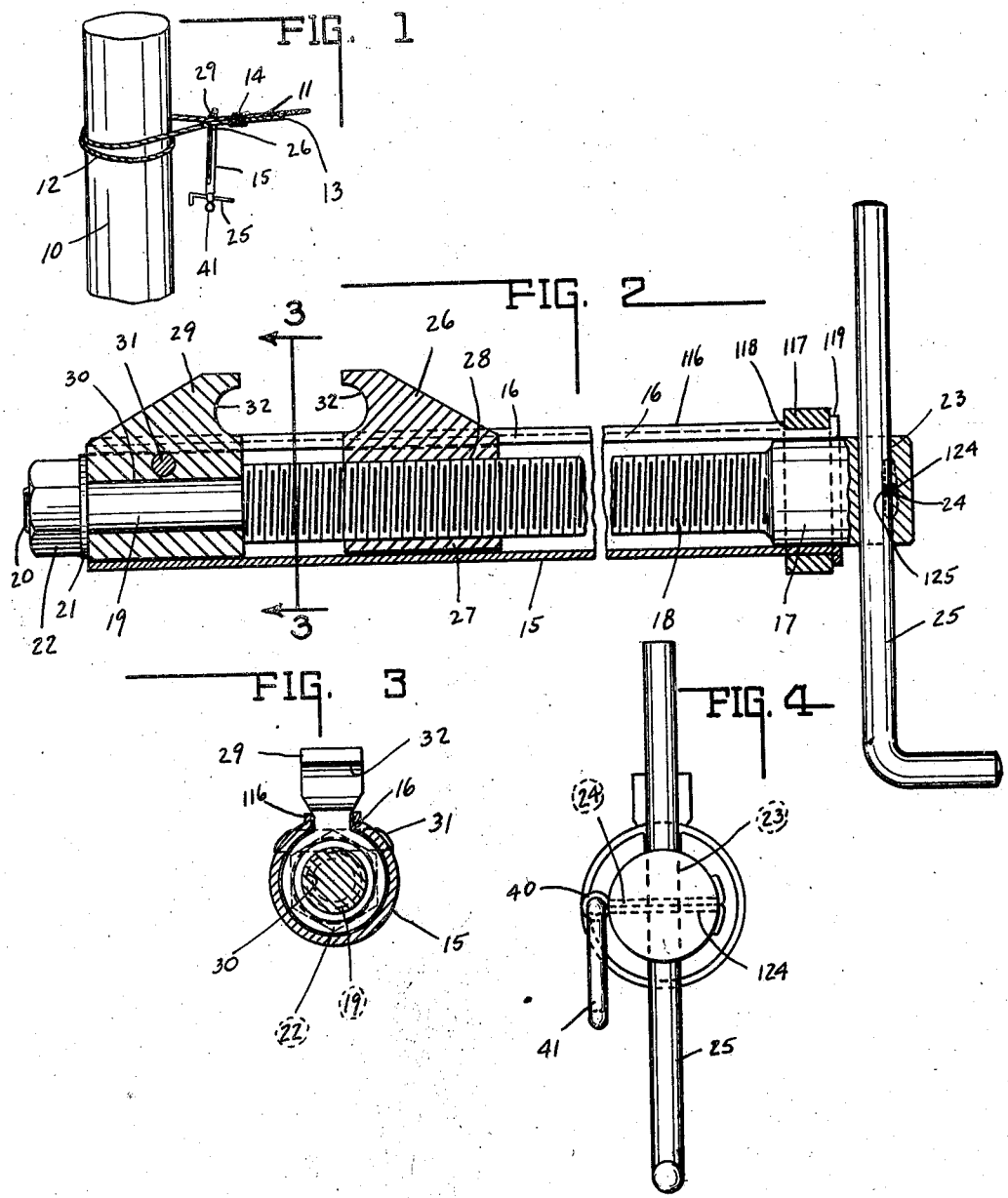

Patented July 1, 1930

1,769,332

UNITED STATES PATENT OFFICE

FREDRICK W. COFFING, OF PERRYSVILLE, INDIANA

PORTABLE GUY CLAMP

Application filed May 14, 1928. Serial No. 277,749.

This invention relates to a wire clamp and portable vice.

The chief object of this invention is to provide a tool that can be held in one hand and readily manipulated by the other when associated with a pair of wires for drawing the same together.

The chief feature of the invention consists in the formation of the vice by a pair of relatively movable jaws, one of which constitutes a shaft bearing for a thread upon which the other is mounted, the latter having a tongue and slot or groove connection for confined movement toward and away from the other jaw.

The full nature of the invention will be understood from the accompanying drawing and the following description and claims:

In the drawings Fig. 1 is a perspective view of the device associated with a pair of wire portions for drawing the same together. Fig. 2 is a longitudinal sectional view through the device. Fig. 3 is a transverse sectional view taken on line 3—3 of Fig. 2 and in the direction of the arrows. Fig. 4 is an end view of the handle end of the vise.

In the drawings 10 indicates a suitable post or anchorage about which is wrapped a wire 11 having a loop portion 12 and the free end 13. In mounting wires upon fencing and the like, it is customary to loop the wire about the anchorage and secure it by a clamp 14. After the wire has been pulled taut to as great an extent as possible by a suitable wire tightening or tensioning device, the loop around anchorage 10 is twisted to increase the tension and take up the last remaining slack. This is done by gripping the two ends of the loop where they meet and drawing the same together. The present device is intended to be employed for that purpose. After the loop has been closed by drawing the ends together an additional clamp is added to maintain the wire in the tautened condition.

The device shown particularly in Figs. 2 and 3 includes a tube 15 having an elongated slot 16 substantially throughout its length. The tube 15 at one end forms a bearing for the body portion 17 of a screw shaft 18 having a bearing on the opposite end as at 19 and an extended and reduced threaded portion 20 which mounts a washer 21 and a nut 22. On the opposite end the screw shaft projects and is transversely apertured as at 23 and mounts a key 24 which secures an angular rod 25 forming a handle for rotating the screw shaft 18. Cotter key 24 in addition to seating in a notch 125 of the handle and extending through the opening 124 in the shaft includes an eye portion 40 which mounts a ring 41 whereby the vise can be snapped on to a lineman's belt.

A wire clamp jaw 26 has a tongue portion 27 mounted within the tube 15 and extending through the slot 16 thereof and the same is apertured and threaded as at 28 within the tube for threaded engagement with the screw shaft 18. Rotation of the screw shaft by the handle 25, therefore, will cause axial reciprocation of the jaw relative to the screw shaft. This jaw 26, therefore, approaches and recedes from the stationary jaw 29 which is also mounted within the tube and includes an axial opening 30 forming a bearing for the bearing portion 19 of the screw shaft. To secure rigidity a pin 31 extends through the tube and the stationary jaw and locks these parts together.

It will be apparent that rotation of the handle 25 will cause the jaws to separate relative to each other a sufficient distance to receive adjacent ends of the loop 11 and 13 which will seat in the curved portions 32 of the jaws. Opposite rotation of the handle 25 will cause said wires to approach each other as the jaws approach each other and after they have been secured in substantially abuttable relation the wire clamp may be placed upon them and rigidly anchored and then the invention released from the wires.

In addition to the aforesaid utility the device, it will be apparent, will also be capable of acting as a small vise, hand operable and supported and also readily portable.

The tube herein is shown provided with an upstanding flange 116 at each edge of the slot and the tube adjacent the end 17 includes a retaining ring 117 that is slidably received, the flange being cut away as at 118 and the tube is then flared laterally as at 119 to lock the collar 117 in position and in retaining relation to prevent opening of the tube.

The invention claimed is:

1. In a portable vise the combination of a main body of the vise made of a metal sheet arranged in tube form with an elongated slot extending substantially from end to end, one end being closed and forming a shaft bearing, the slot being widened at and by the edges being extended outwardly from the tube to brace the latter and forming a relatively deep guiding passageway therebetween, a movable jaw extending into the tube with its passageway confined portion reduced, said jaw and extension projecting laterally upon both sides of the passageway and within the tube and above the passageway, another jaw receivable by the open end of the tube for closing the same, means extending through the last mentioned jaw and the spaced tube sides for securing the same together, and a shaft rotatably mounted in the tube and having threaded connection with the tube receivable extension of the movable jaw for moving the same.

2. A device as defined by claim 1 characterized by the shaft extending through the tube and projecting at opposite ends beyond the same, a shaft anchorage on one projecting end, and a shaft rotating handle on the opposite end.

3. In a portable vise the combination with a stationary jaw support, a movable jaw moving member extending therethrough and projecting beyond the same, and an actuating member extending transversely through the projecting portion, said members adjacent the connection including registering apertures, of a cotter key having a circular eye and seatable in the apertures and projecting beyond with its free ends turned laterally for securing the members together, and a ring providing a substantial loop swivably supported by the cotter key eye portion.

In witness whereof, I have hereunto affixed my signature.

FREDRICK W. COFFING.